United States Patent Office 2,978,161
Patented Apr. 4, 1961

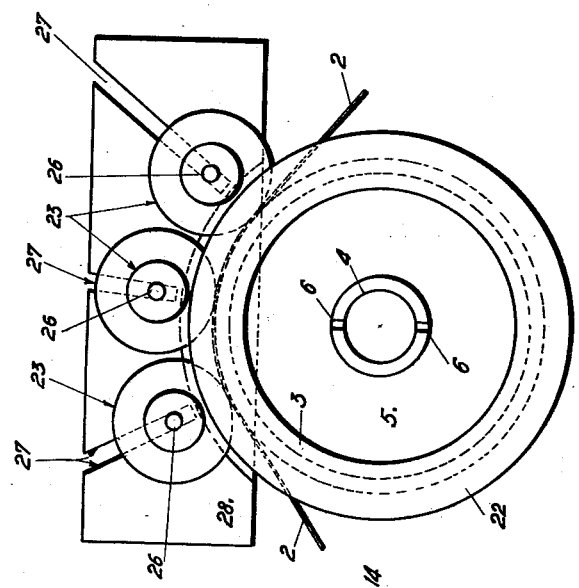
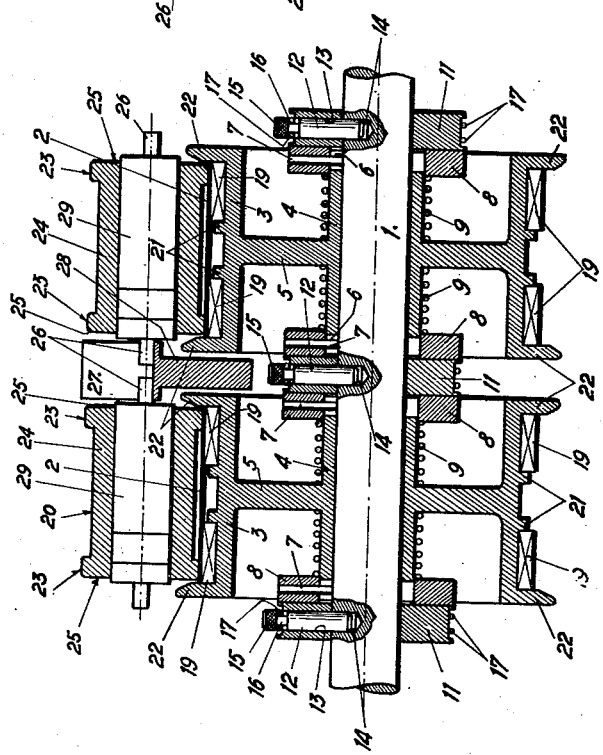

2,978,161
ARRANGEMENT FOR DRIVING FILMS IN A MACHINE TREATING KINEMATOGRAPHIC FILMS

Andre Victor Leon Clement Debrie, 111 Street St. Maur, Paris, France

Filed Nov. 5, 1956, Ser. No. 620,369
Claims priority, application France Nov. 15, 1955
7 Claims. (Cl. 226—183)

My invention has for its object an arrangement for driving kinematographic films through the agency of drums shifted angularly in a continuous manner over their driving shaft and against which the film is urged by the weight of rollers engaging it.

In arrangements of this type as proposed hitherto, the rollers were secured in alignment over a common longitudinal spindle and were thus axially rigid with one another so that any defective bearing of the rollers on one of the drums or any differences in speed between the films on the different drums detrimentally affected the whole arrangement.

My invention removes these drawbacks by providing relative independence for the different rollers engaging each drum with reference to one another except for the fact that they are driven by the same film and the drums associated with these rollers are flanged and are driven into rotation by means which are proof against misadjustment and are ensured in a very simple manner providing a limited torque.

The arrangement according to my invention provides for the driving of a kinematographic film in a treating machine through the agency of drums sliding angularly over the common driving shaft, said flanged drums being provided at least in the sections adjacent their flanges with elastic annular peripheral surfaces over which the film rests through its uncoated surface, the film being urged against said annular surfaces by rollers acting through their own weight and rolling over the film, said rollers which are completely independent from one another having no relationship between them otherwise than through the driven film. Furthermore, said rollers which engage the interval between the flanges of the co-operating drums are provided at their ends with coaxial trunnions sliding freely in downwardly extending slots provided in intermediate stationary supports, and they urge the film into position at least through one raceway at each end, said terminal raceways being separated by a section of a smaller diameter. On the other hand, the drums are provided with hubs revolubly carried by a cylindrical driving spindle with the interposition between them and also at the ends of the spindle of rings of plastic material fitted over said spindle when the drums are being positioned and held fast against rotation and longitudinal shifting by a pin entering a radial opening inside which said pin is held elastically; a ring or washer of plastic material is adapted to slide without rotating on each end of each hub and engages the corresponding surface of an adjacent ring or washer rigid with the driving spindle under the action of a gauged spring fitted over each end of the hub and subjected to compression upon positioning of said last mentioned ring.

I have illustrated in accompanying drawings and by no means in a limiting sense a preferred embodiment of my invention so as to make its arrangement clear. In said drawings:

Fig. 1 is a longitudinal elevational sectional view of two successive drums of a film developing machine while Fig. 2 is a corresponding transverse elevational view.

In said figures, 1 designates the driving spindle which revolves at an angular speed which is higher than that corresponding to the drive of the films 2 through the drums without any slip.

These drums are provided with hubs 4 the axial bores which allow said drums to revolve round and to slide over the spindle 1 with a minimum clearance. These hubs, which are cylindrical, extend to either side of a central transverse web 5 and they are provided at each of their free ends with at least one slot 6 inside which is positioned a pin 7 radially carried by a ring of plastic material 8 adapted to be shifted over the corresponding end of the hub and rotating in unison with the latter under the action of said pin 7 which may move longitudinally inside the slot 6.

A gauged spring 9 is held fast between the medial web 5 and the ring 8 and urges permanently the latter outwardly. Said ring 8 has its outer surface thus constantly urged against the corresponding surface of another ring 11 of plastic material having parallel outer surfaces so as to exert a braking action on the said ring 8. Said rings 11 are fitted by hand together with the drums 3, the rings 9 and the rings 8 over the spindle 1 during the assembly of the arrangement. Each ring 11 is held fast in position on the spindle 1 as provided by introducing by hand a cylindrical pin 12 inside a recess 13 provided radially in the ring 11 and inside a cylindrical recess 14 provided radially in the spindle 1 to register with said recess 13.

The cylindrical pin 12 is provided outwardly with a knurled section 15 forming a readily hand-operable knob and separated from the body of the cylindrical pin 12 by an annular groove 16 engaged by a locking piano wire 17 which prevents the pin 12 from moving out of the recess 14 during the rotation of the spindle 1. Each drum 3 in the series of drums driven by the spindle 1 is, generally speaking, provided with two outer aligned sleeves 19 made of elastic material and housed between the corresponding annular peripheral rib 21 and terminal flanges 22 on the drum 3. These sleeves 19 are provided outwardly with two cylindrical bearing surfaces of equal diameters against which the edges of the film 2 are urged by the raceways 23 formed on the ends of the corresponding roller 24; said raceways are separated by a relieved section 20 forming a depression in the central part of the periphery of the roller while the raceways at the ends of the rollers end with terminal surfaces 25, the outer edges of which at least engage the flanges 22 of the drum 3.

Laterally projecting trunnions 26 formed axially of the rollers 24 are guided inside slots 27 formed in the transverse stationary carrier 28 provided between and above the drums 3. These trunnions are guided inside the slots 27 with clearances which allow the rollers 24 to move freely therein under the action of gravity and to urge the film onto the surfaces of the drum constituted by the sleeves 19 operating the drive of the film through adherence.

The outer surfaces of the rollers 24 may be made of plastic material while their coaxial cores 29 may be made of a metal the specific weight of which is selected so as to obtain a more or less energetic application of the film onto said sleeves 19.

The rollers are mounted for instance three by three so as to urge the corresponding film onto a cooperating drum. It is possible to select their weight, their diameter and the slope of the slots 27 with a view to adjusting as desired the pressure exerted by them on the drum in accordance with the position given to them.

It is possible when draining the film to use at least one perfectly smooth cylindrical roller of a trued non-oxidizable metal for instance, said roller bearing throughout the breadth of the film on a drum provided throughout its operative breadth with a cylindrical coat of elastic material replacing the sleeves 19 and stopping exactly in register with the edges of the film beyond the space carrying the pictures and the sound tracks.

The operation of this arrangement is obvious from the preceding description. The rings 8 and 11 the friction between which defines the driving stress, associated with an angular shifting, transmitted by the spindle 1 to the drums 3 and to the film, are advantageously made of a plastic material such as that sold under the registered trademark "nylon" while the springs 9 are preferably made of stainless steel.

I obtain thus an arrangement which requires no further adjustment beyond a gauging of the springs at the start and which retains permanently a maximum value for the driving torque providing proper operation in spite of the dropping of liquid onto the different parts of the mechanism.

The positioning of the drums on the spindle and of the auxiliary braking and positioning parts is performed speedily and readily, which allows an easy upkeep and replacement of the different parts.

Obviously, at the ends of the series of aligned drums, the rings or washers 11 of which only one surface operates frictionally are secured in the same manner as those provided between two successive drums, but the outer surfaces of said rings obviously do not engage frictionally the stationary supports inside which the spindle 1 revolves so as not to produce any unnecessary friction at such points.

What I claim is:

1. In a machine for treating kinematographic films, a film driving arrangement comprising a driving spindle, a succession of aligned drums each including a tubular hub through which said spindle passes coaxially with clearance, a first series of rings of plastic material secured in unvarying angular and longitudinal position on the spindle between the successive drum hubs and in register with the outer ends of the outermost drum hubs, a further series of longitudinally slidable rings respectively angularly rigid with the ends of each drum hub, springs fitted on the hubs and urging the slidable rings of the second series into engagement with the cooperating rings of the first series, an elastic annular coat for each drum at least adjacent the ends thereof for engagement by the uncoated surface of the film to be treated, a plurality of rollers distributed independently of one another above each drum for engagement with the film to urge the latter against the drum coat, at least one stationary support provided with slots arranged radially of the spindle and axial extensions on the rollers guided in said support slots.

2. In a machine for treating kinematographic films, a film driving arrangement comprising a driving spindle, a succession of aligned drums each including a tubular hub through which said spindle passes coaxially with clearance, a first series of rings of plastic material secured in unvarying angular and longitudinal position on the spindle between the successive drum hubs and in register with the outer ends of the outermost drum hubs, a further series of longitudinally slidable rings angularly rigid with the ends of each drum hub, springs fitted on the hubs and urging the slidable rings of the second series into engagement with the cooperating rings of the first series, said drums including terminal flanges the spacing between which is equal to the width of the corresponding film to be treated, elastic sleeves of equal diameters fitted over each drum adjacent the ends thereof and engaging the inner surfaces of the corresponding drum flanges and adapted to guide said film to be treated, a plurality of rollers distributed independently of one another above each drum, a number of stationary supports provided with slots arranged radially of the spindle and axial extensions on the rollers guided in said support slots to allow said rollers to engage through gravity the film sections on the elastic sleeves.

3. In a machine for treating kinematographic films, a film driving arrangement comprising a driving spindle, a succession of aligned drums each including a tubular hub through which said spindle passes coaxially with clearance, a first series of rings of plastic material secured in unvarying angular and longitudinal position on the spindle between the successive drum hubs and in register with the outer ends of the outermost drum hubs, a further series of longitudinally slidable rings angularly rigid with the ends of each drum hub, springs fitted on the hubs and urging the slidable rings of the second series into engagement with the cooperating rings of the first series, each of said drums including terminal flanges the spacing between which is equal to the width of the corresponding film to be treated, elastic sleeves of equal diameters fitted over each drum adjacent the ends thereof and engaging the inner surfaces of the corresponding drum flanges and adapted to guide said film to be treated, a plurality of rollers distributed independently of one another above each drum, stationary supports extending between each two successive drums and provided with slots arranged radially of the spindle and axial extensions on the rollers guided in said support slots to allow the latter to engage the films on the sleeves under the action of gravity.

4. In a machine for treating kinematographic films, a film driving arrangement comprising a driving spindle, a succession of aligned drums each including a tubular hub through which said spindle passes coaxially with clearance, a first series of rings of plastic material secured in unvarying angular and longitudinal position on the spindle between the successive drum hubs and in register with the outer ends of the outermost drum hubs, a further series of longitudinally slidable rings angularly rigid with the ends of each drum hub, springs fitted on the hubs and urging the slidable rings of the second series into engagement with the cooperating rings of the first series, a plurality of said drums including terminal flanges the spacing between which is equal to the width of the corresponding film to be treated, at least one elastic sleeve fitted over each drum and adapted to guide said film to be treated, a plurality of rollers distributed independently of one another above each drum provided with said terminal flanges and including enlarged terminal sections adapted to engage the corresponding sections of the films on the drum sleeves, stationary supports provided with slots arranged radially of the spindle, and axial extensions on the rollers guided in said support slots.

5. In a machine for treating kinematographic films, a film driving arrangement comprising a driving spindle; at least a pair of drums arranged beside each other and respectively having coaxial tubular hubs through which said spindle coaxially passes; means cooperating with said spindle and drums for transmitting rotation of said spindle to said drums while freeing said drums for slippage with respect to said spindle when the turning of said drums with said spindle is resisted; at least one roller arranged over each drum for pressing a film strip thereagainst, said rollers being completely disconnected from each other; and guide means cooperating with said rollers to guide the same for free movement under the influence of their own weight substantially radially toward the common axis of said drums.

6. In a machine as recited in claim 5, each roller including an outer sleeve of non-metallic material and an inner metal core located in said sleeve.

7. In a machine as recited in claim 6, said core of each roller being heavier than said sleeve thereof.

References Cited in the file of this patent

UNITED STATES PATENTS

| 1,600,592 | Kesses | Sept. 21, 1926 |
| 1,855,827 | Flint et al. | Apr. 6, 1932 |
| 1,873,463 | Oehmichen | Aug. 23, 1932 |
| 2,579,741 | Houston | Dec. 25, 1951 |